(12) United States Patent
Braun et al.

(10) Patent No.: US 10,476,352 B2
(45) Date of Patent: Nov. 12, 2019

(54) HOUSING CONFIGURATION FOR AN ELECTRIC MACHINE WITH COOLING JACKET

(71) Applicant: Volkswagen Aktiengesellschaft, Wolfsburg (DE)

(72) Inventors: Andreas Braun, Kassel (DE); Christine Wohlfeld, Geismar (DE); Patric Knorr, Schmölln (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 93 days.

(21) Appl. No.: 15/803,802

(22) Filed: Nov. 5, 2017

(65) Prior Publication Data

US 2018/0131253 A1 May 10, 2018

(30) Foreign Application Priority Data

Nov. 10, 2016 (DE) .................. 10 2016 222 051

(51) Int. Cl.
*H02K 9/00* (2006.01)
*H02K 9/20* (2006.01)
(Continued)

(52) U.S. Cl.
CPC ............ *H02K 9/197* (2013.01); *H02K 1/185* (2013.01); *H02K 1/20* (2013.01); *H02K 5/06* (2013.01); *H02K 5/20* (2013.01); *H02K 9/19* (2013.01)

(58) Field of Classification Search
CPC ............ H02K 1/185; H02K 1/20; H02K 5/06; H02K 5/20; H02K 9/19; H02K 9/197
See application file for complete search history.

(56) References Cited

U.S. PATENT DOCUMENTS

2009/0243446 A1* 10/2009 Platen ............... H02K 5/20
312/236
2012/0080965 A1 4/2012 Bradfield
(Continued)

FOREIGN PATENT DOCUMENTS

CN 101080863 A 11/2007
CN 102751818 A 10/2012
(Continued)

OTHER PUBLICATIONS

Search Report including Provisional Assessment of Patentability issued by the German Patent and Trademark Office for German Patent Application No. DE 10 2016 222 051.9, dated Sep. 12, 2017.
(Continued)

*Primary Examiner* — Yuriy Semenenko
(74) *Attorney, Agent, or Firm* — Manfred Beck, P.A.

(57) ABSTRACT

A housing configuration for an electric machine includes a housing having a stator receiving region with a wall. A stator is disposed in the stator receiving region of the housing and a sleeve is pushed onto the stator. A cooling jacket surrounds the stator for liquid cooling of the stator. The cooling jacket has a radially outer cooling-jacket surface and a radially inner cooling-jacket surface with a gap between the radially outer cooling-jacket surface and the radially inner cooling-jacket surface. The wall of the stator receiving region forms the radially outer cooling-jacket surface of the cooling jacket. The sleeve forms the radially inner cooling-jacket surface of the cooling jacket. Bilaterally acting seal carriers are inserted into the gap between the radially outer cooling-jacket surface and the radially inner cooling-jacket surface. The bilaterally acting seal carriers provide an axial sealing of the cooling jacket. An electric machine is also provided.

13 Claims, 1 Drawing Sheet

(51) Int. Cl.
    *H02K 9/197* (2006.01)
    *H02K 1/20* (2006.01)
    *H02K 5/06* (2006.01)
    *H02K 1/18* (2006.01)
    *H02K 5/20* (2006.01)
    *H02K 9/19* (2006.01)

(56) References Cited

U.S. PATENT DOCUMENTS

| | | | |
|---|---|---|---|
| 2012/0267969 A1 | 10/2012 | Iwamoto et al. | |
| 2012/0313465 A1* | 12/2012 | Prix | H02K 5/20 310/54 |
| 2013/0300229 A1* | 11/2013 | Muller | H02K 5/20 310/54 |
| 2014/0139061 A1* | 5/2014 | Gutjahr | H02K 9/197 310/86 |
| 2015/0207378 A1 | 7/2015 | Buttner et al. | |
| 2017/0346370 A1* | 11/2017 | Sentis | H02K 15/14 |
| 2018/0076694 A1* | 3/2018 | Aronovich | H02K 15/12 |
| 2018/0131247 A1* | 5/2018 | Froehlich | H02K 1/20 |

FOREIGN PATENT DOCUMENTS

| | | |
|---|---|---|
| CN | 205401126 U | 7/2016 |
| DE | 10 2008 061 275 A1 | 9/2009 |
| DE | 10 2009 031 727 A1 | 2/2010 |
| DE | 11 2011 103 345 T5 | 7/2013 |
| DE | 10 2012 213 070 A1 | 1/2014 |
| DE | 10 2012 213 237 A1 | 1/2014 |
| DE | 10 2012 016 208 A1 | 2/2014 |
| DE | 10 2012 023 050 A1 | 5/2014 |
| DE | 10 2013 006 623 A1 | 10/2014 |
| DE | 10 2013 217 779 A1 | 3/2015 |
| DE | 10 2014 214 724 A1 | 1/2016 |
| WO | 2006/106086 A1 | 10/2006 |

OTHER PUBLICATIONS

Search Report dated May 5, 2019, issued by the State Intellectual Property Office of People's Republic of China for Chinese Patent Application No. 201711063252.9 which is related to U.S. Appl. No. 15/803,802.

* cited by examiner

HOUSING CONFIGURATION FOR AN ELECTRIC MACHINE WITH COOLING JACKET

CROSS-REFERENCE TO RELATED APPLICATIONS

This application claims the priority, under 35 U.S.C. § 119, of German Patent Application No. DE 10 2016 222 051.9, filed Nov. 10, 2016; the prior application is herewith incorporated by reference in its entirety.

BACKGROUND OF THE INVENTION

Field of the Invention

The invention relates to a housing configuration for an electric machine having a cooling jacket for liquid cooling of the stator of the electric machine.

An electric machine refers to an electromechanical converter which converts electrical energy into mechanical energy and/or mechanical energy into electrical energy. An electric machine is, in particular, an electric motor (e-motor) and/or generator having a fixed stator or stationary part and a rotor or moving part (internal rotors) rotatably mounted in the stator.

In motor vehicles, such electric machines are used for example as a drive motor (traction motor) and/or generator (alternator). The electric machine is almost always arranged in a housing or the like. With a usually limited installation space or constricted space conditions (the available radial installation space is often only 10 mm to 20 mm which calls for a compact construction), high power densities sometimes occur, which necessitates active cooling of the electric machine. This active cooling generally takes place with the aid of a cooling jacket, surrounding the stator, for liquid cooling. Such a cooling jacket usually includes a closed, at least approximately annular cylindrical or hollow cylindrical cavity (cooling jacket space), which is delimited by a radially outer cooling jacket surface, a radially inner cooling jacket surface and lateral or axial seals. The cavity moreover has an inlet and outlet for the cooling liquid (generally water or oil) and can furthermore also be divided into individual sections or segments. Torque support for the stator surrounded by the cooling jacket furthermore has to be provided on the housing, which can take place for example through the use of a cover or bearing shield.

German Patent Application Publication No. DE 10 2012 016 208 A1 of the same applicant describes a housing having a cooling jacket for a unit, in particular for an electric motor. An inner part receiving the stator is connected to the outer part of the housing via an integrally formed bearing shield and is thus secured and torque-supported.

With regard to the prior art, reference is made to International Publication No. WO 2006/106086 A1 and to German Patent Application Publication Nos. DE 10 2008 061 275 A1, DE 10 2009 031 727 A1, DE 10 2012 023 050 A1, DE 10 2012 213 237 A1 and DE 10 2014 214 724 A1.

SUMMARY OF THE INVENTION

It is accordingly an object of the invention to provide a housing configuration for an electric machine which makes it possible to produce the housing configuration in case of constricted space conditions with low material-, machine- and time-related costs and outlay.

With the foregoing and other objects in view and in order to satisfy the above-mentioned requirements, there is provided, in accordance with the invention, a housing configuration for an electric machine, including:

a housing having a stator receiving region with a wall;

a stator disposed in the stator receiving region of the housing;

a sleeve pushed onto the stator;

a cooling jacket surrounding the stator for liquid cooling of the stator, the cooling jacket having a radially outer cooling-jacket surface and a radially inner cooling-jacket surface with a gap between the radially outer cooling-jacket surface and the radially inner cooling-jacket surface;

the wall of the stator receiving region forming the radially outer cooling-jacket surface of the cooling jacket;

the sleeve forming the radially inner cooling-jacket surface of the cooling jacket; and bilaterally acting seal carriers inserted into the gap between the radially outer cooling-jacket surface and the radially inner cooling-jacket surface, the bilaterally acting seal carriers providing an axial sealing of the cooling jacket.

In other words, according to the invention, there is provided a housing configuration for an electric machine, including:

a housing having a stator receiving region;

a stator of the electric machine, which is disposed in the stator receiving region of the housing; and a cooling jacket surrounding the stator for liquid cooling of the stator, wherein the wall of the stator receiving region forms the radially outer cooling-jacket surface of the cooling jacket and the radially inner cooling-jacket surface is formed by a sleeve pushed onto the stator, wherein the axial sealing of the cooling jacket takes place through the use of bilaterally acting seal carriers inserted into the gap between the outer cooling-jacket surface and the inner cooling-jacket surface.

Preferred further developments and embodiments of the housing configuration according to the invention are revealed in the dependent claims, the description below and the figures.

The housing configuration according to the invention is characterized in that the radially outer cooling-jacket surface of the cooling jacket or cooling-jacket space is formed by the wall, i.e. by the inner wall, of the stator receiving region and the radially inner cooling-jacket surface is formed by a sleeve pushed onto the stator, and in that the axial sealing of the cooling jacket takes place through the use of bilaterally acting seal carriers, i.e. acting with respect to both the outer cooling-jacket surface and the inner cooling-jacket surface, which are inserted into the gap between the outer cooling-jacket surface and the inner cooling-jacket surface. These are preferably separately formed seal carriers.

The invention enables the construction of a compact housing configuration from a few simple (i.e. neither complex nor characterized by high function integration) and favorably producible structural parts or components, to some extent with only low requirements in terms of their mechanical processing, which can furthermore be installed quickly and easily. The requirements in terms of precision are lower than in other housing configurations known from the prior art which have a constructed cooling jacket (see below), i.e. a cooling jacket formed by assembling or installing individual components.

According to a feature of the invention, the sleeve is formed from metal and has a radial wall thickness of no greater than 1.0 mm.

The sleeve is preferably formed from a metal, for example from steel or aluminum. The sleeve preferably has a radial thickness or wall thickness of no greater than 1.0 mm (≤1.0 mm). The sleeve can also be formed thicker and can have a thickness of up to 5.0 mm, preferably up to 3.5 mm. The stator and the sleeve are preferably connected in a torsion-resistant manner, i.e. in a manner fixed against relative rotation, preferably pressed, bonded, soldered or welded. The heat transfer between the stator and the sleeve surrounding it can be improved with the use of a heat-conductive paste or the like, wherein the heat-conductive paste can also simplify the installation.

A seal carrier can be formed from metal, for example from steel or aluminum. However, a seal carrier can also be formed from plastics material, in particular fiber-reinforced plastics material.

According to another feature of the invention, the housing is a cast metal part.

The housing or a correspondingly formed housing part is preferably a cast metal part and in particular a light-metal die-cast part, for example an aluminum or magnesium die-cast part.

According to another feature of the invention, a centering ring is provided; and the stator has axial ends and is supported at at least one of the axial ends on the housing by the centering ring.

The stator is preferably supported on the housing by a centering ring at at least one of its axial ends. The centering ring, which is formed in particular from metal, for example from steel or aluminum, on the one hand realizes the concentric alignment of the stator together with the sleeve surrounding the stator in the stator receiving region of the housing and, on the other hand, serves for the torque support of the stator on the housing. At the relevant axial end, preferably at both axial ends, the support of the stator therefore takes place through the use of a centering ring and not, as was hitherto conventional, through the use of a bearing shield, whilst the axial sealing of the cooling jacket is realized by the inserted seal carrier. The sealing and torque-support functions are therefore separate.

According to another feature of the invention, a bearing shield is provided; and the centering ring together with the bearing shield are fastened to the housing.

According to a further feature of the invention, the centering ring together with the bearing shield is screwed to the housing.

The centering ring can be fastened, in particular tightly screwed, to the housing together with a bearing shield. A bearing shield is a cover or base which is formed in particular from metal, for example from steel or aluminum, which preferably has a central bore through which the rotor shaft of the electric machine extends and in particular also serves for mounting the rotor shaft. However, this bearing shield does not, as was hitherto conventional, assume the torque support of the stator and/or the axial sealing of the cooling jacket (this is realized by the centering ring and the seal carrier, as described above). The centering ring and the bearing shield can be formed with flanges on which the common fastening to the housing takes place. The fastening takes place in particular by a screw connection using screws so that the fastening can be produced and later also released again without introducing heat.

According to another feature of the invention, the centering ring is integrally formed with one of the bilaterally acting seal carriers.

According to yet another feature of the invention, the centering ring and one of the bilaterally acting seal carriers are formed together as a single piece.

The centering ring and the seal carrier for the axial sealing of the same cooling-jacket side can be integrally formed, for example as a welded part, and in particular in a single piece, i.e. produced in one piece. The integral or even single-piece form facilitates the installation.

According to another feature of the invention, each of the bilaterally acting seal carriers is formed with at least one first annular groove for receiving a seal which seals with respect to the radially outer cooling-jacket surface; and each of the bilaterally acting seal carriers is formed with at least one second annular groove for receiving a seal which seals with respect to the sleeve.

According to a further feature of the invention, each of the bilaterally acting seal carriers is formed with at least one first molded-on seal for sealing with respect to the radially outer cooling-jacket surface and with at least one second molded-on seal for sealing with respect to the sleeve.

The seal carriers can be formed with at least one first annular groove for receiving a seal which seals with respect to the radially outer cooling-jacket surface and at least one second annular groove for receiving a seal which seals with respect to the sleeve or the radially inner cooling-jacket surface. Alternatively, the seal carriers can be formed with at least one first molded-on or injection-molded seal for sealing with respect to the radially outer cooling-jacket surface, and at least one second molded-on or injection-molded seal for sealing with respect to the sleeve or the radially inner cooling-jacket surface.

According to another feature of the invention, the stator is formed from a plurality of stator laminations, the stator laminations are held together by the sleeve and the stator laminations are sealed with respect to the cooling jacket by the sleeve.

The stator is thus preferably formed from a plurality of stator laminations (i.e. the stator includes at least one so-called stator lamination stack), which are held together by the pushed-on sleeve and sealed with respect to the cooling jacket.

According to a further feature of the invention, at least one insert is provided in the cooling jacket, wherein the at least one insert functions as a flow guiding element.

At least one insert functioning as a flow guiding element can be disposed in the cooling jacket or in the cooling-jacket space, which insert steers the cooling liquid through the cooling jacket in a defined manner. The insert can be formed as a plastics part, in particular an injection molded part. In the housing configuration according to the invention, the cooling jacket is formed not until the installation by assembling the components and closed (so-called constructed cooling jacket as an alternative to the cooling jacket which is integrated by casting), so that the insert can be inserted without difficulty during the installation. The insert can also facilitate the (concentric) centering of the stator in the stator receiving region of the housing.

The housing can be any e-motor/generator housing with integrated stator cooling, in particular for use in the automotive sector. The invention is equally suitable for vehicles having a purely electric drive and vehicles having a hybrid drive. Therefore, the housing can also be a so-called hybrid transmission housing or hybrid transmission housing part for a motor vehicle. This hybrid transmission housing has a stator receiving region, for example, for accommodating an electric motor serving as a traction or drive motor (optionally also with a generator function) and/or a generator, wherein the electric motor and/or generator or the stator thereof can be actively cooled by the surrounding cooling jacket configured according to the invention.

With the objects of the invention in view there is also provided, an electric machine including:
- a stator and a rotor;
- a housing having a stator receiving region with a wall;
- the stator being disposed in the stator receiving region of the housing;
- a sleeve pushed onto the stator;
- a cooling jacket surrounding the stator for liquid cooling of the stator, the cooling jacket having a radially outer cooling-jacket surface and a radially inner cooling-jacket surface with a gap between the radially outer cooling-jacket surface and the radially inner cooling-jacket surface;
- the wall of the stator receiving region forming the radially outer cooling-jacket surface of the cooling jacket;
- the sleeve forming the radially inner cooling-jacket surface of the cooling jacket; and
- bilaterally acting seal carriers inserted into the gap between the radially outer cooling-jacket surface and the radially inner cooling-jacket surface, the bilaterally acting seal carriers providing an axial sealing of the cooling jacket.

With the aid of a possible exemplary embodiment, the invention is explained in more detail below, in a non-restrictive manner, with reference to the figures. Taken in isolation from concrete feature combinations, the features shown in the figures and/or explained below can also be general features of the invention and can further develop the invention.

Although the invention is illustrated and described herein as embodied in an electric machine and a housing configuration for an electric machine with a cooling jacket, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
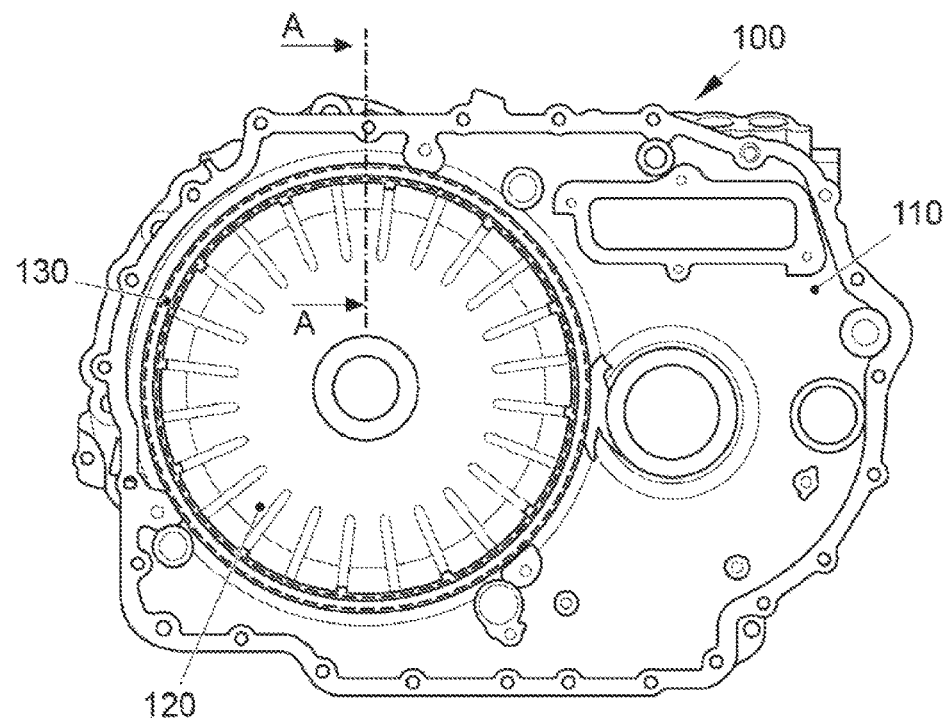
FIG. 1 is a side elevational view of a hybrid transmission housing part in accordance with the invention.

Referring now to the figures of the drawing in detail and first, particularly, to FIG. 1 thereof, there is shown a hybrid transmission housing part 110 of a hybrid transmission 100 for a motor vehicle (passenger car) having a hybrid drive. The housing part 110 is a light-metal and in particular aluminum die-cast component. 120 denotes a stator receiving region, formed as a cup-like (pot-shaped) cavity (hollow space), for an electric motor (traction motor) and/or generator to be arranged in the hybrid transmission 100. During operation, the electric motor and/or generator have to be actively cooled to reliably dissipate the heat produced. To this end, an integrated cooling channel or cooling jacket 130 is provided, through which a cooling liquid can flow. That is to say, the stator of the electric motor or generator, which is received in the stator receiving region 120, is actively cooled by the cooling liquid flowing around it. The annular cylindrical cooling jacket 130 illustrated by dashed circular lines can have a mean diameter of 250 mm to 300 mm for example. In FIG. 1, the cooling jacket 130 is only indicated schematically by dashed lines. The arrangement and the construction are revealed more precisely in FIG. 2.

Figure 2:
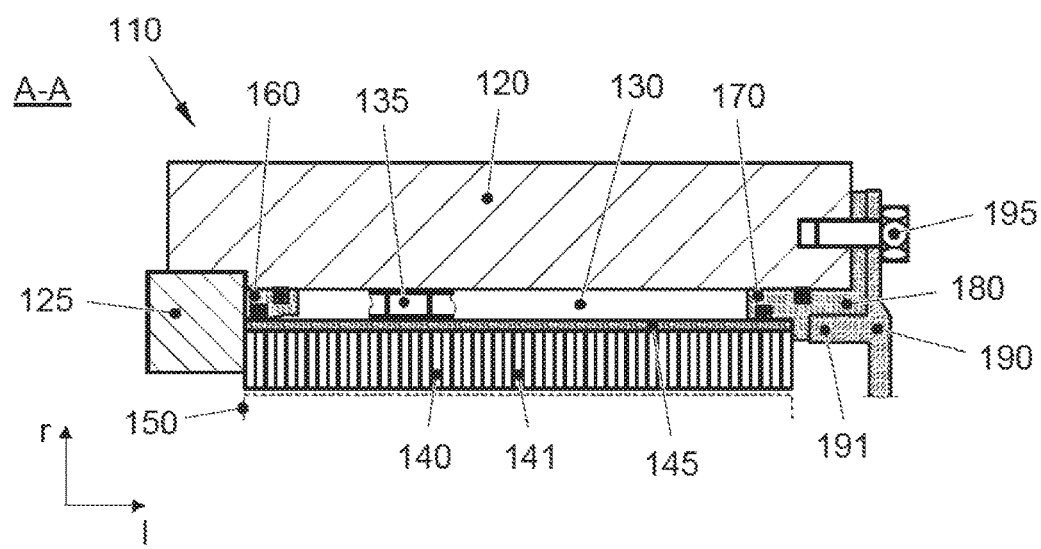
FIG. 2 is a diagrammatic sectional view along section line (A-A) indicated in FIG. 1 for illustrating the cooling jacket in accordance with the invention.

FIG. 2 shows a section through the cooling jacket 130 according to the section line A-A indicated in FIG. 1. The electric motor or generator received in the housing part 110 has a stator 140, which is arranged in the stator receiving region 120 and is formed from individual stator laminations 141, and a rotor 150 indicated by a dashed line. The axial direction is indicated by l and the radial direction by r. The stator 140 is surrounded by a pushed-on metal sleeve or sheet-metal sleeve 145. The sleeve 145 at the same time forms the radially inner cooling-jacket surface of the cooling jacket 130. The radially outer cooling-jacket surface of the cooling jacket 130 is formed directly by the cast inner wall of the stator receiving region 120. The axial sealing of the cooling jacket 130 takes place through the use of separately formed, bilaterally acting seal carriers 160 and 170 inserted in the gap between the outer cooling-jacket surface and the inner cooling-jacket surface. The two seal carriers 160 and 170 form the lateral or axial cooling-jacket surfaces, so to speak. The seal carriers 160 and 170 are formed with first and second annular grooves in which sealing rings (O-rings) are arranged, which seal with respect to the radially outer cooling-jacket surface or with respect to the inner wall of the stator receiving region 120 and with respect to the inner cooling-jacket surface or with respect to the sleeve 145.

The axial positioning and support of the stator 140 together with the surrounding sleeve 145 takes place via an annular shoulder 125, which can also be integrally formed on the housing part 110, and indirectly via an (outer) bearing shield 190 which is tightly screwed to the housing 110 and effectively functions as a cover. Instead of the shoulder 125, it is also possible to provide a separately formed (inner) bearing shield which effectively functions as a base.

During operation, a torque acts on the stator 140, which is why the stator 140 has to be supported on the housing 110 (torque support) to prevent a rotation with the rotor 150 or a rotation relative to the housing 110 or the stator receiving region 120 thereof. The torque support takes place partially through the support on the shoulder 125, but mainly with the aid of a centering ring 180 which, in the exemplary embodiment shown, is formed in one piece (single-piece construction) with the seal carrier 170 on the bearing-shield side and through the use of which the concentric centering of the stator 140 in the stator receiving region 120 is also realized. The centering ring 180 is tightly screwed (see screw 195) to the housing 110 together with the bearing shield 190 and, through the use of the collar 191 of the bearing shield 190, is clamped in the axial direction l against the stator 140 and the sleeve 145 which are supported on the shoulder 125 at the other axial end. The supporting torque transmission between the stator 140 and the bearing ring 180 fixed to the housing 110 takes place through the use of friction fit (friction-locking connection), material fit (material bond for example by soldering or welding) and/or through the use of form fit (form-locking connection for example through the use of toothed elements). The outer seal carrier 170 on the bearing-shield side is held in position as a result of being formed in a single piece with the centering ring 180. The inner shoulder-side seal carrier 160 is for example pressed onto the sleeve 145 or bonded to the sleeve 145.

An insert or insert part 135 can be arranged in the interior of the integrated cooling jacket 130, which insert or insert part functions as a flow guiding element for the cooling liquid and aids the centering of the stator 140 in the stator receiving region 120.

LIST OF REFERENCE CHARACTERS

100 Transmission
110 Housing/housing part
120 Stator receiving region
125 Annular shoulder
130 Cooling jacket
135 Insert
140 Stator
141 Stator lamination
145 Sleeve
150 Rotor
160 Seal carrier
170 Seal carrier
180 Centering ring
190 Bearing shield
191 Collar
195 Screw
l Axial direction
r Radial direction

What is claimed is:

1. A housing configuration for an electric machine, comprising:
    a housing having a stator receiving region with a wall;
    a stator disposed in said stator receiving region of said housing;
    a sleeve pushed onto said stator;
    said wall and said sleeve being separately formed components;
    a cooling jacket surrounding said stator for liquid cooling of said stator, said cooling jacket having a radially outer cooling-jacket surface and a radially inner cooling-jacket surface with a gap between said radially outer cooling-jacket surface and said radially inner cooling-jacket surface;
    said cooling jacket being a substantially annular cylindrical cooling jacket, wherein said radially outer cooling-jacket surface and said radially inner cooling-jacket surface define a substantially hollow cylindrical shape encircling said stator;
    said wall of said stator receiving region forming said radially outer cooling-jacket surface of said cooling jacket;
    said sleeve forming said radially inner cooling-jacket surface of said cooling jacket; and
    bilaterally acting seal carriers inserted into the gap between said radially outer cooling-jacket surface and said radially inner cooling-jacket surface, said bilaterally acting seal carriers providing an axial sealing of said cooling jacket.

2. The housing configuration according to claim 1, including:
    a centering ring;
    said centering ring providing a torque support of said stator on said housing; and
    said stator having axial ends and being supported at at least one of said axial ends on said housing by said centering ring.

3. The housing configuration according to claim 2, including:
    a bearing shield; and
    said centering ring together with said bearing shield being fastened to said housing.

4. The housing configuration according to claim 2, including:
    a bearing shield; and
    said centering ring together with said bearing shield being screwed to said housing.

5. The housing configuration according to claim 2, wherein said centering ring is integrally formed with one of said bilaterally acting seal carriers.

6. The housing configuration according to claim 2, wherein said centering ring and one of said bilaterally acting seal carriers are formed together as a single piece.

7. The housing configuration according to claim 1, wherein:
    each of said bilaterally acting seal carriers is formed with at least one first annular groove for receiving a seal which seals with respect to said radially outer cooling-jacket surface; and
    each of said bilaterally acting seal carriers is formed with at least one second annular groove for receiving a seal which seals with respect to said sleeve.

8. The housing configuration according to claim 1, wherein each of said bilaterally acting seal carriers is formed with at least one first molded-on seal for sealing with respect to said radially outer cooling-jacket surface and with at least one second molded-on seal for sealing with respect to said sleeve.

9. The housing configuration according to claim 1, wherein said sleeve is formed from metal and has a radial wall thickness of no greater than 1.0 mm.

10. The housing configuration according to claim 1, wherein said stator is formed from a plurality of stator laminations, said stator laminations are held together by said sleeve and said stator laminations are sealed with respect to said cooling jacket by said sleeve.

11. The housing configuration according to claim 1, including at least one insert provided in said cooling jacket, said at least one insert functioning as a flow guiding element.

12. The housing configuration according to claim 1, wherein said housing is a cast metal part.

13. An electric machine comprising:
    a stator and a rotor;
    a housing having a stator receiving region with a wall;
    said stator being disposed in said stator receiving region of said housing;
    a sleeve pushed onto said stator;
    said wall and said sleeve being separately formed components;
    a cooling jacket surrounding said stator for liquid cooling of said stator, said cooling jacket having a radially outer cooling-jacket surface and a radially inner cooling-jacket surface with a gap between said radially outer cooling-jacket surface and said radially inner cooling-jacket surface;
    said cooling jacket being a substantially annular cylindrical cooling jacket, wherein said radially outer cooling-jacket surface and said radially inner cooling-jacket surface define a substantially hollow cylindrical shape encircling said stator;
    said wall of said stator receiving region forming said radially outer cooling-jacket surface of said cooling jacket;

said sleeve forming said radially inner cooling-jacket surface of said cooling jacket; and bilaterally acting seal carriers inserted into the gap between said radially outer cooling-jacket surface and said radially inner cooling-jacket surface, said bilaterally acting seal carriers providing an axial sealing of said cooling jacket.

* * * * *